(12) United States Patent
Dougherty

(10) Patent No.: US 7,615,092 B2
(45) Date of Patent: Nov. 10, 2009

(54) FILTERING MASK

(76) Inventor: William J. Dougherty, 8 Sheffield Ct., Newnan, GA (US) 30265

( * ) Notice: Subject to any disclaimer, the term of this patent is extended or adjusted under 35 U.S.C. 154(b) by 0 days.

(21) Appl. No.: 11/581,624

(22) Filed: Oct. 16, 2006

(65) Prior Publication Data

US 2008/0086996 A1   Apr. 17, 2008

(51) Int. Cl.
- B01D 39/14 (2006.01)
- A62B 7/10 (2006.01)
- A62B 19/00 (2006.01)
- A62B 18/02 (2006.01)
- A62B 18/08 (2006.01)

(52) U.S. Cl. .............. 55/524; 128/206.21; 128/206.22; 128/206.23; 128/206.24; 128/206.16; 128/206.17; 128/206.18; 128/206.19; 128/206.2

(58) Field of Classification Search ............... 55/524; 128/206.16–206.24
See application file for complete search history.

(56) References Cited

U.S. PATENT DOCUMENTS

| | | | | |
|---|---|---|---|---|
| 2,349,285 A | * | 5/1944 | Korf et al. ................. 132/220 |
| 2,655,150 A | * | 10/1953 | Cupp .................... 128/206.19 |
| 3,049,121 A | | 8/1962 | Brumfield et al. |
| 3,130,722 A | | 4/1964 | Dempsey et al. |
| 3,471,871 A | * | 10/1969 | Nociti et al. ................. 4/484 |
| 3,695,264 A | | 10/1972 | Laeral |
| 4,004,584 A | | 1/1977 | Geaney |
| 4,027,340 A | | 6/1977 | Hadtke |
| 4,417,575 A | | 11/1983 | Hilton et al. |
| 4,419,994 A | | 12/1983 | Hilton et al. |
| 4,467,799 A | | 8/1984 | Steinberg |
| 4,790,307 A | * | 12/1988 | Haber et al. .......... 128/206.19 |
| 4,827,924 A | * | 5/1989 | Japuntich .............. 128/206.12 |
| 4,883,052 A | | 11/1989 | Weiss et al. |
| 4,984,302 A | | 1/1991 | Lincoln |
| 5,129,103 A | * | 7/1992 | Gruneisen .................... 2/12 |
| 5,681,630 A | * | 10/1997 | Smick et al. ............... 428/40.1 |
| 5,699,792 A | * | 12/1997 | Reese et al. ............ 128/206.19 |
| 5,724,964 A | * | 3/1998 | Brunson et al. ......... 128/206.19 |
| 5,836,303 A | | 11/1998 | Hurst et al. |
| 5,863,312 A | * | 1/1999 | Wolfe ........................ 55/495 |
| 6,123,077 A | | 9/2000 | Bostock et al. |
| D449,377 S | * | 10/2001 | Henderson et al. ....... D24/110.1 |
| 6,308,330 B1 | | 10/2001 | Hollander et al. |
| 6,394,090 B1 | * | 5/2002 | Chen et al. ............. 128/206.12 |
| 6,526,975 B1 | | 3/2003 | Chung |
| 6,536,434 B1 | * | 3/2003 | Bostock et al. ......... 128/206.12 |
| 6,718,981 B2 | * | 4/2004 | Cardarelli .............. 128/206.19 |

(Continued)

Primary Examiner—Walter D Griffin
Assistant Examiner—Amber Orlando
(74) Attorney, Agent, or Firm—Merchant & Gould, P.C.

(57) ABSTRACT

A filtering apparatus may comprise a base material folded in a folded state. A filter may be attached to the base material. In addition, the filtering apparatus may comprise a perforation. The perforation may be configured to define a portion of the base material configured to be removed from the base material. The base material may be configured to be transformable to an unfolded state when the portion of the base material is removed along the perforation. An adhesive may be attached to the base material. The adhesive may be configured to adhere the filtering apparatus around at least one orifice of a subject when the base material is in the unfolded state. In addition, the filter may be doped with medication or other substances depending upon an intended application. The filtering apparatus may also contain a tactile area to assist the subject in using the filtering apparatus.

19 Claims, 4 Drawing Sheets

U.S. PATENT DOCUMENTS

| | | | |
|---|---|---|---|
| 6,823,868 B1 * | 11/2004 | Begum | 128/206.19 |
| 2004/0055078 A1 | 3/2004 | Griesbach, III et al. | |
| 2004/0089304 A1 | 5/2004 | Barakat et al. | |
| 2005/0194010 A1 | 9/2005 | Sankot | |
| 2008/0011303 A1 * | 1/2008 | Angadjivand et al. | 128/206.19 |

* cited by examiner

FILTERING MASK

BACKGROUND

Filtration devices are used in many applications. They may be used to protect a human's respiratory system from particles suspended in the air or from unpleasant or noxious gases. For example, filtration devices may comprise a molded cup-shaped forms to be held to a subject's face by the subject or by an elastic strap that encircles the subject's head. The cup-shaped filtration devices are bulky and subject to being crushed. In addition, the cup-shaped filtration devices are enclosed in a separate package that must be opened and discarded before use. This often causes problems because conventional cup-shaped filtration devices are not self contained and require special handling to ensure they are not damaged while stored.

SUMMARY OF THE INVENTION

Consistent with embodiments of the present invention a filtering apparatus is disclosed. The filtering apparatus may comprise a base material folded in a folded state. A filter may be attached to the base material. In addition, the filtering apparatus may comprise a perforation. The perforation may be configured to define a portion of the base material configured to be removed from the base material. The base material may be configured to be transformable to an unfolded state when the portion of the base material is removed along the perforation. An adhesive may be attached to the base material. The adhesive may be configured to adhere the filtering apparatus around at least one orifice of a subject when the base material is in the unfolded state.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
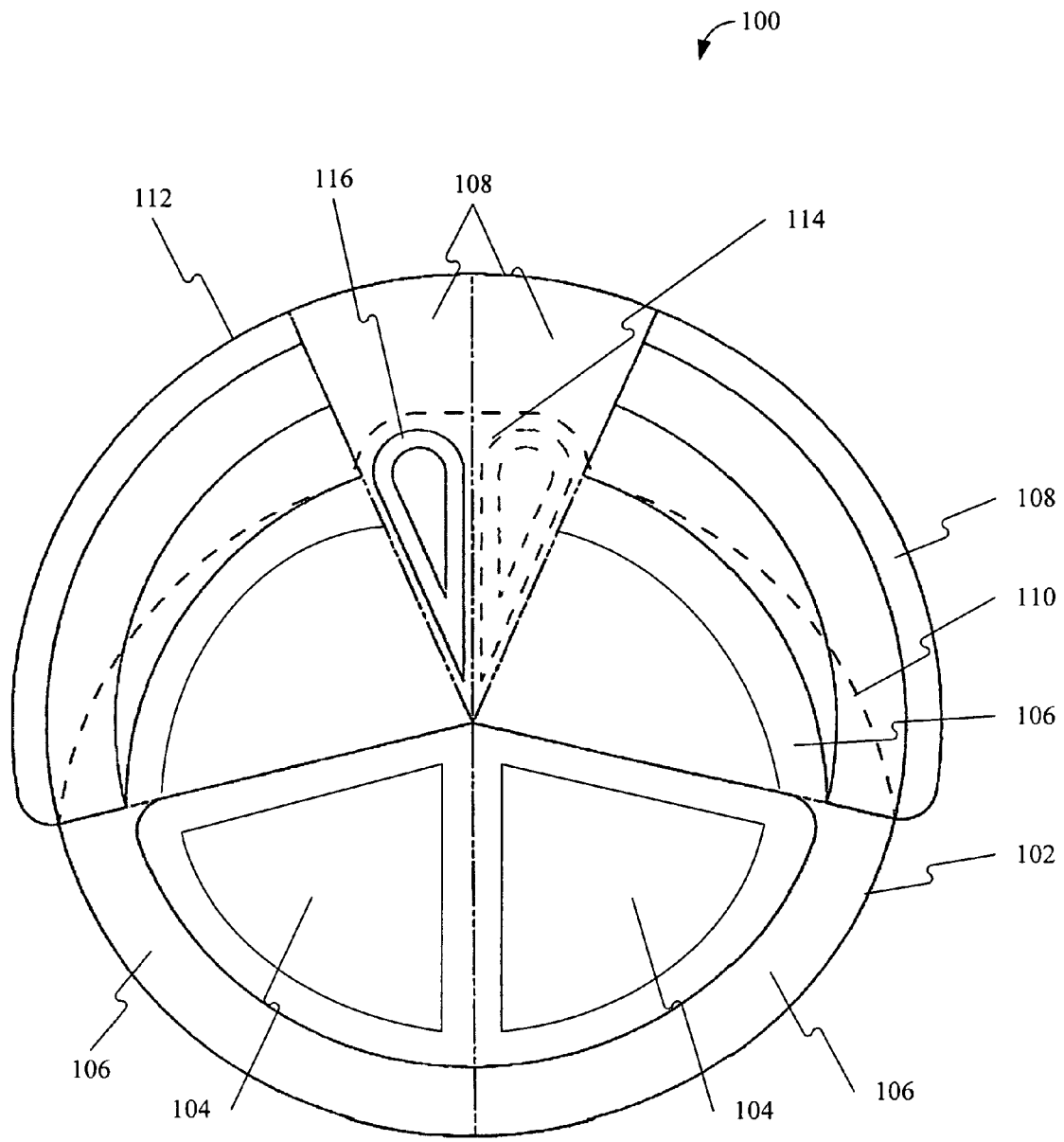
FIG. 1 shows a filtering apparatus.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A filtering apparatus may be provided. Consistent with embodiments of the present invention, the filtering apparatus may comprise a substantially plainer base material that may include a filter and an adhesive. After a portion of the base material is removed along a perforation, the base material may be unfolded. Once the base material is unfolded, the adhesive may cause the filtering apparatus to adhere to a subject's face. The adhesive may also form a seal around the subject's mouth, nose, or both, causing the subject to respire through the filter. The filtering apparatus may also include a tactile area. The tactile area may enable the subject to handle, orient, and/or place the filtering apparatus on the subject's face in low light situations or other conditions when visibility may be impaired.

FIG. 1 shows filtering apparatus 100 that may include a base material 102, a filter 104, adhesives 106 and 108, and a perforation 110. For example, base material 102 may be a permeable material, semi permeable material, impermeable material, a medical grade material such as those used to manufacture surgical mask, latex, vinyl, cloth, or other polymer materials. In addition, base material 102 need not be a single material. Base material 102 may include multiple materials interwoven to form a homogenous material. In addition, base material 102 may include multiple layers forming a composite structure. Base material 102 may be woven or non-woven. The aforementioned are examples, and base material 102 may comprise any material.

As stated above, base material 102 may include perforation 110 or other structures to allow a portion 112 to be separated from base material 102. Portion 112 may seal filter 104 in base material 102 when folded in the folded state. In other words, filter 104 may be encapsulated in base material 102 when portion 112 is attached and base material 102 is in the folded state. In this way, filter 104 may be sealed in base material 100 and protected form elements outside base material 102. In addition, a portion or all of adhesive 106 may become exposed when portion 112 is removed.

Filtering apparatus 100 may include an indicator configured to indicate if filtering apparatus 100 has been tampered. For example, perforation 110 may act as the indicator. For example, if perforation 110 is torn the subject may be advised that tampering may have occurred. In addition, a ribbon may be embedded in base material 102, straddling at least a portion of perforation 110. If perforation 110 is punctured and/or exposed to extreme conditions such as high/low temperature or excessive moisture, for example, the ribbon may discolor, fracture, or provide other indications of a potential problem. The color of the ribbon may decay with time and/or exposure to heat and may provide an indication that filtering apparatus 100 has aged or has been exposed to high temperatures. Furthermore, base material 102 may include a chemical treatment which acts as the indicator. The chemical treatment may discolor with age or when subjected to extreme temperatures and/or humidity.

Figure 4B:
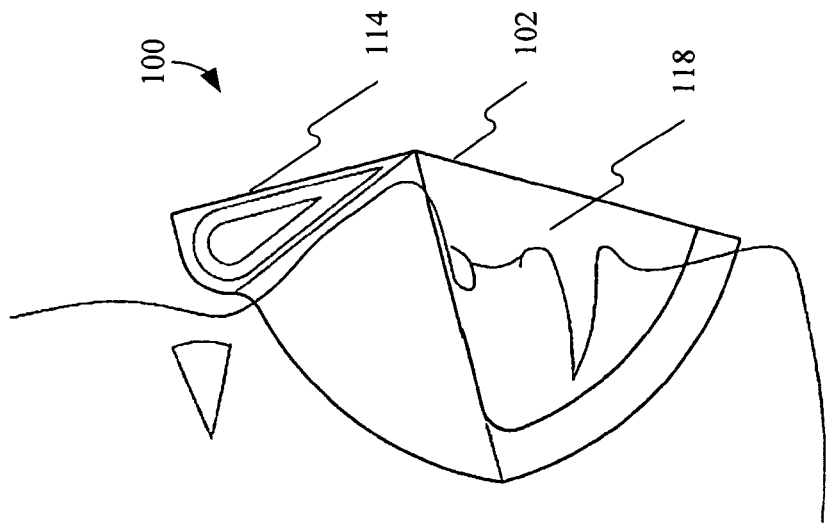
FIGS. 4A and 4B show a filtering apparatus' frontal and side view.
Figure 4A:
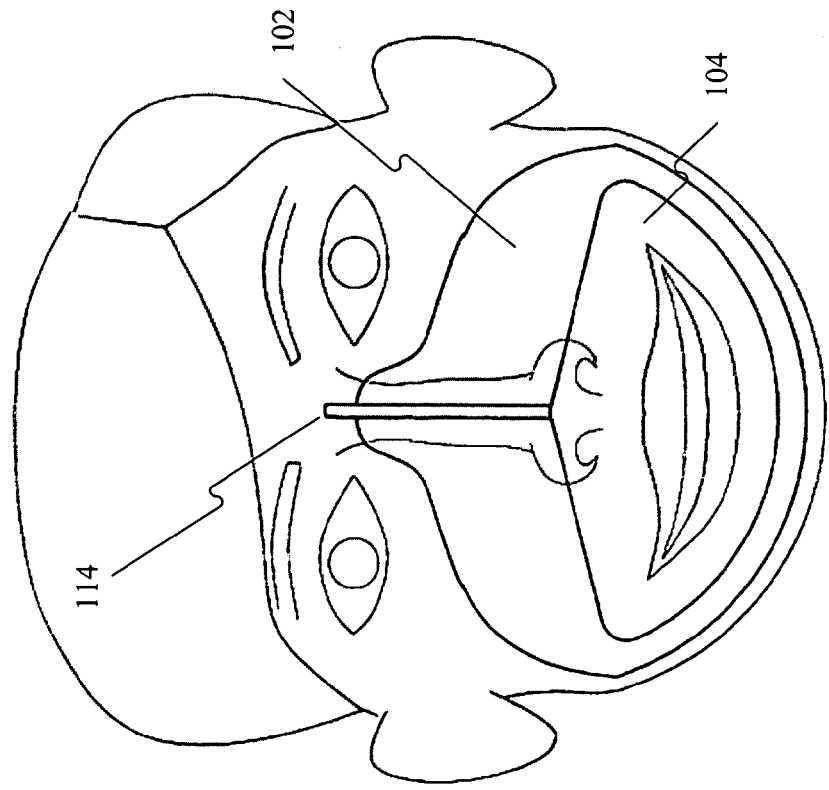

Filter 104 may comprise any type filter. For example, filter 104 may be a dust filter, a bacterial filter, a viral filter, a charcoal filter, or a High Efficiency Particulate Air (HEPA) filter. In addition, filter 104 may be a single filter as shown in FIG. 4A or multiple filters as shown in FIG. 1. Regardless of whether filter 104 comprises a single filter or multiple filters, filter 104 may be configured such that when filtering apparatus 100 is in the folded state, filter 104 remains in an unfolded state. In other words, when base material 102 is in the folded state, filter 104 may be substantially plainer, unfolded, and uncreased. Furthermore, filter 104 may comprise multiple layers of additional filters such as those previously listed. The additional layers may form a composite layer filter.

In addition, filter 104 may include a dopant. For example, the dopant may be a liquid such as water, a medicine, or a material that when subjected to a shock, releases a second dopant. For example, filtering apparatus 100 may be used during egress from a smoke filled building. In this case, the dopant may be water. In another example, filtering apparatus 100 may be used to deliver medication. In this case, the dopant may be asthma medication or some other medication that may be administered by inhalation.

Furthermore, filtering apparatus 100 may be intended for multiple uses. In this case, the dopant may be a substance that when subjected to shock or other activation action, releases the second dopant. For example, filtering apparatus 100 may be a general use device for filtering allergens such as pollen. In this case filter 104 may be dry. Should the subject desire greater filtration, however, filtering apparatus 100 may be subject to a physical shock (e.g. such as striking against a surface or between the subject's hands). In this case, the dopant, (e.g. in a crystalline form) may release water or an antihistamine to help combat the subject's allergy.

Adhesive 106 may be applied to base material 102 such that when filtering apparatus 100 is applied to the subject, adhesive 106 is operative to bond filtering apparatus 100 to the subject. The bond between filtering apparatus 100 and the subject may be a permanent bond, a semi permanent bond, a temporary bond, or other type bond. For example, if filtering apparatus 100 is applied to a human subject, a temporary bond may be appropriate. A temporary bond may include use of adhesive that easily separate from the subject and/or do not leave a residue or other traces of adhesive 106 when removed. In addition, adhesive 106 may be applied to base material 102 in any of pattern. For example, adhesive 106 may be applied as strips of constant width as shown in FIG. 1, as a zigzag pattern, a multitude of dots placed at various locations or may circumscribe filter 104. Furthermore, adhesive 106 may comprise any sealing property (e.g. impermeable, semi-permeable, or permeable). For example, adhesive 106 may form a seal which is impermeable and may force a subject to respire through filter 104.

Adhesive 108 may be applied to base material 102 in such a manner that upon folding base material 102 along a symmetry axis 120, mating surfaces may become permanently bonded to one another. While FIG. 1 shows a symmetric placement of adhesive 108, adhesive 108 may be applied in various manners such as those recited above for adhesive 106.

In addition, filtering apparatus 100 may include tactile area 114. Tactile area 114 may be used to grip filtering apparatus 100. In addition, tactile area 114 may be used to assist in determining filter apparatus 100's orientation. Tactile area 114 may assist the subject in handling filtering apparatus 100 in conditions where visibility may be limited or otherwise impeded. In addition, tactile area 114 may include an indentation and/or an insert 116 designed to aid the subject in gripping, determining orientation, and/or applying filtering apparatus 100. For example, an arrow indicating orientation or Brail lettering may be included in tactile are 114 to assist persons with sight impairments.

Consistent with an embodiment of the invention shown in FIG. 1, a layout of adhesives 106 and 108, filter 104 on base material 102 are shown. Furthermore, plastic insert 116 and/or other features may be laid out as well as tactile area 114.

Figure 2A:
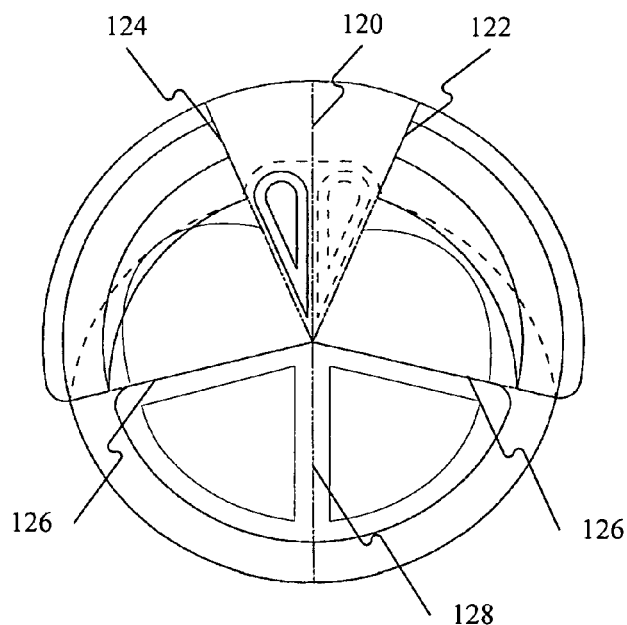
FIGS. 2A-2C show stages in which a base material may be folded.
Figure 2B:
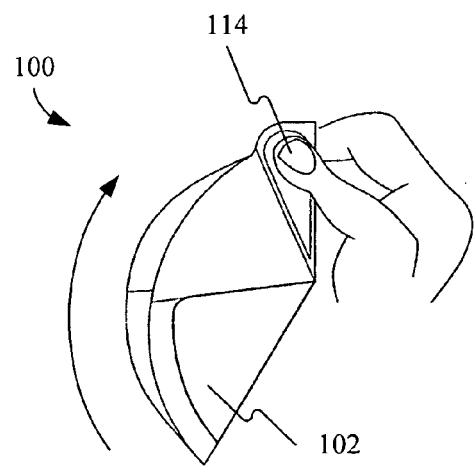
Figure 2C:
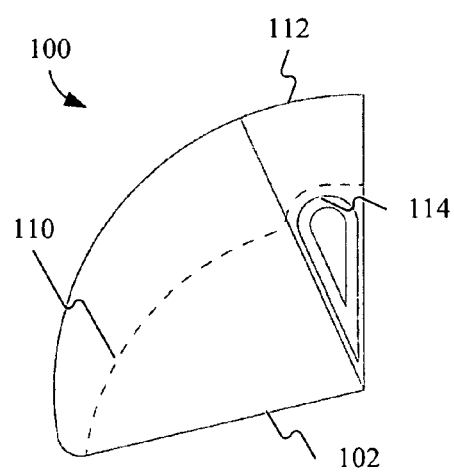
Figure 3A:
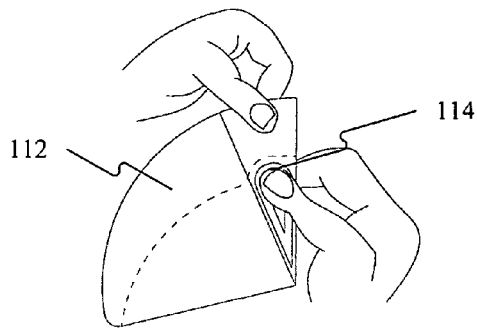
FIGS. 3A-3D show the filtering apparatus operation.
Figure 3B:
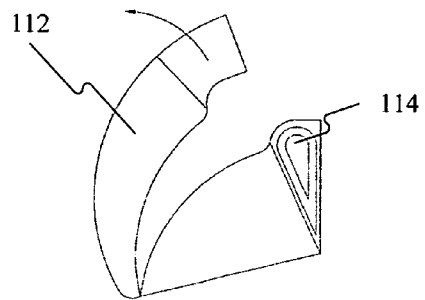
Figure 3C:
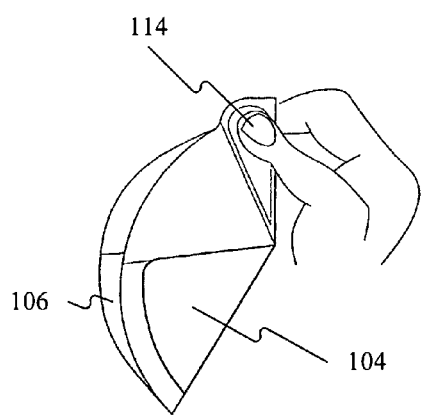
Figure 3D:
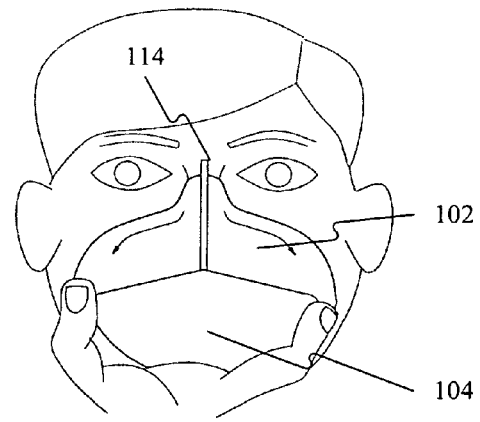

FIGS. 2A-2C show stages in which base material 102 may be folded. Once filter 104 and adhesives 106 and 108 have been applied, base material 102 (see FIG. 1) may be folded along a fold line 120 such that a construction line 122 mates with a construction line 124. (See FIG. 2A.) After base material 102 has been folded along fold line 120, a second fold may be made along fold line 126 such that a lower portion of a lower hemi circle of base material 102 may be substantially parallel to a upper hemi circle of base materials 102. (See FIG. 2B.) After, the fold along fold line 120 is complete; a final fold may be made along fold line 128. As a result, filter 104 may be substantially parallel to base material 102, and filter may be sealed within base material 102. Furthermore, upon folding along fold line 120, filtering apparatus 100 may be substantially plainer and construction of filtering apparatus 100 may be complete, see FIG. 2C. Additional operations may be performed as desired.

FIG. 3A-3D shows the filtering apparatus 100 configured to be transformed to an unfolded state. First, the subject may locate tactile area 114. Then the subject may grip filtering apparatus 100 using tactile area 114. (See FIG. 3A.) Next, the subject may separate portion 112. See FIG. 3B.) Then the subject may unfold filtering apparatus 100. (See FIG. 3C.) The subject may then place filtering apparatus 100 over their nose and mouth. Next, the subject may apply pressure to base material 102's outer surface such that adhesive 106 is pressed to contact with the subject's face. (See FIG. 3D.) The aforementioned unfolding operation may be reversed by the subject. This may return filtering apparatus 100 to its original folded (i.e. substantially plainer) state. Removable portion 112 may be reattached.

FIG. 4A shows filtering apparatus 100's frontal view. As shown in FIG. 4A, filter 104 may comprise a single filter. FIG. 4B shows filtering apparatus 100's side view. As shown in FIG. 4B, a space 118 may form when filtering apparatus 100 is worn by the subject. With space 118, filter 104 may not contact the subject's face.

Filtering apparatus 100 in use by a human subject, it is contemplated that filtering apparatus 100 may be used on non-human subjects and/or other environments where a substance may need to be filtered. For example, filtering apparatus 100 may be place over a pipe's orifice of and filter a gas exiting and/or entering the pipe.

While certain embodiments of the invention have been described, other embodiments may exist. The invention's scope is indicated by the following claims. Furthermore, while the specification has been described in language specific to structural features and/or methodological acts, the claims are not limited to the features or acts described above. Rather, the specific features and acts described above are disclosed as examples for embodiments of the invention.

What is claimed is:

1. A filtering apparatus comprising:
   a base material in a folded state;
   a filter attached to the base material wherein the filter is encapsulated in the base material in the folded state;
   a perforation configured to define a portion of the base material, the portion configured to be removed from the base material, the base material configured to be transformable to an unfolded state when the portion of the base material is removed along the perforation;
   an adhesive attached to the base material, the adhesive configured to adhere the filtering apparatus around at least one orifice of a subject when the base material is in the unfolded state.

2. The filtering apparatus of claim 1, wherein the adhesive circumscribes the filter.

3. The filtering apparatus of claim 1, wherein the subject is a living organism and the adhesive is configure to substantially seal around the at least one orifice and configured to cause the living organism to respire through the filter.

4. The filtering apparatus of claim 1, wherein the filter comprises a doping agent.

5. The filtering apparatus of claim 4, wherein the doping agent comprises a medication.

6. The filtering apparatus of claim 4, wherein the doping agent comprises a substance configured to cause the filter to become moist when the substance is subjected to a shock.

7. The filtering apparatus of claim 1, wherein the folded state comprises the base material being substantially planer.

8. The filtering apparatus of claim 1, further comprising a tactile area.

9. The filtering apparatus of claim 8, wherein the tactile area is configured for at least one of the following: facilitating gripping the filtering apparatus and indicating an orientation of the filtering apparatus.

10. The filtering apparatus of claim 1, wherein at least a portion of the adhesive is configured to be exposed when the portion of the base material is removed.

11. The filtering apparatus of claim 1, further comprising an indicator configured to indicate the filter's state.

12. The filtering apparatus of claim 1, further comprising an indicator configured to indicate the filter's state comprising at least one of the following: out of date, tampered with, and spoiled.

13. The filtering apparatus of claim 1, wherein the filtering apparatus is configured to be refolded to a substantially planar state after use.

14. The filtering apparatus of claim 1, wherein the filter comprises at least one of the following: a charcoal filter, a High Efficiency Particulate Air (HEPA) filter, a bacterial filter, and a viral filter.

15. The filtering apparatus of claim 1, wherein the filter is configured to filter allergens.

16. The filtering apparatus of claim 1, wherein the filter is unfolded when the filtering apparatus is in the folded state.

17. The filtering apparatus of claim 1, wherein the filter is sealed within the base material when the portion of the base material is attached to the base material.

18. A filtering apparatus comprising:
a base material in a folded state;
a first filter and a second filter attached to the base material, the first filter and the second filter being located in different quadrants of the base material wherein, when the base material is in the folded state both the first filter and the second filter are substantially planar in substantially parallel planes and are encapsulated in the base material;
a perforation configured to define a portion of the base material configured to be removed from the base material, the base material configured to be transformable to an unfolded state when the portion of the base material is removed along the perforation;
an adhesive attached to the base material, the adhesive configured to adhere the filtering apparatus around at least one orifice of a subject when the base material is in the unfolded state.

19. A filtering apparatus comprising:
a base material in a folded state, wherein the base material is substantially planar in the folded state;
a filter attached to the base material, wherein the filter comprises a doping agent, wherein the filter is encapsulated in the base material in the folded state;
a tactile area configured to facilitate gripping the filtering apparatus and configured to indicate an orientation of the filtering apparatus;
a perforation configured to define a portion of the base material configured to be removed from the base material, the base material configured to be transformable to an unfolded state when the portion of the base material is removed along the perforation, wherein the unfolded state is configured to create a space between the filter and at least one orifice of a subject; and
an adhesive attached to the base material, the adhesive configured to adhere the filtering apparatus around the at least one orifice when the base material is in the unfolded state.

* * * * *